United States Patent

[11] 3,626,940

| [72] | Inventor | Alejandro Zaffaroni<br>Atherton, Calif. |
|---|---|---|
| [21] | Appl. No. | 821,468 |
| [22] | Filed | May 2, 1969 |
| [45] | Patented | Dec. 14, 1971 |
| [73] | Assignee | Alza Corporation |

[54] OCULAR INSERT
4 Claims, 4 Drawing Figs.

[52] U.S. Cl. .................................................. 128/260,
128/1.3
[51] Int. Cl. ....................................................A61m 31/00
[50] Field of Search............................................ 128/260,
261, 268, 1.4, 1.3, 264, 303.1, 76.5; 351/160

[56] References Cited
UNITED STATES PATENTS
3,416,530  12/1968  Ness.............................. 128/260
FOREIGN PATENTS
35,302  11/1964  Japan........................... 351/160

Primary Examiner—Robert W. Michell
Assistant Examiner—R. P. Dyer
Attorney—Steven D. Goldby ABSTRACT: Drug dispensing ocular insert for insertion into the cul-de-sac of the conjunctiva between the sclera of the eyeball and the lid to dispense drug to the eye over a prolonged period of time is adapted for convenient insertion and removal by incorporation of a magnetically attractable substance therein. The ocular insert can be inserted and removed from the cul-de-sac using a magnetic tool.

INVENTOR
ALEJANDRO ZAFFARONI

ATTORNEYS

OCULAR INSERT

BACKGROUND OF THE INVENTION

This invention relates to an ocular insert for dispensing drugs to the eye and, more especially, to an improved ocular insert that can be inserted and removed in a convenient manner.

Ocular inserts represent a significant advance in the therapy of eye disease. Rather than periodically treating the eye with medication in liquid or ointment form which is rapidly removed from the eye surface by tears, ocular inserts provide for a sustained release of drug to the eye for a prolonged period of time. Such inserts are further described in U.S. Pat. No. 3,416,530, to Dr. Richard A. Ness, assigned to the assignee of the present invention.

Drug dispensing ocular inserts are fabricated of polymers that are insoluble in tear liquid since erosion or dissolution of the insert would interfere with the continuous and controlled release of drug to the eye, rendering the therapeutic program unpredictable. Suitable materials for fabricating the ocular inserts are flexible polymers through which drug will diffuse or be leached by the action of tear liquid at a slow rate. Exemplary materials for fabricating the ocular insert include hydrophobic polymers such as polyvinylchloride plasticized with long-chain fatty amides, plasticized nylon, unplasticized soft nylon, silicone rubber, and polyethylene; and hydrophilic polymers such as the hydrophilic hydrogels of esters of acrylic and methacrylic acid (as described in U.S. Pat. Nos. 2,976,576 and 3,220,960 and Belgian Pat. No. 701,813), modified collagen, cross linked hydrophilic polyether gels (as described in U.S. Pat. No. 3,419,006), cross linked polyvinylalcohol, cross linked partially hydrolyzed polyvinylacetate, cellulosic gels such as methylcellulose and hydroxyethylcellulose; and ion exchange resins, especially those with a low degree of cross linking.

Any of the drugs used to treat the eye and surrounding tissues can be incorporated in the ocular insert. Also, it is practical to use the eye and surrounding tissues as a point of entry for systemic drugs that enter circulation in the blood stream and produce a pharmacologic response at a site remote from the point of application of the ocular insert. Thus, drugs which will pass through the eye or the tissue surrounding the eye to the blood stream, but which are not used in therapy of the eye itself, can be incorporated in the ocular insert.

Suitable drugs for use in therapy of the eye with an ocular insert include, without limitation: Antiinfectives: such as antibiotics, including tetracycline, chlortetracycline, bacitracin, neomycin, polymyxin, gramicidin, oxytetracycline, chloramphenicol, and erythromycin; sulfonamides, including sulfacetamide, sulfamethizole and sulfisoxazole; antivirals, including idoxuridine; and other antiinfectives including nitrofurazone and sodium propionate; antiallergenics such as antazoline, methapyrilene, chlorpheniramine, pyrilamine and prophenpyridamine; antiinflammatories such as hydrocortisone, hydrocortisone acetate, dexamethasone, dexamethasone 21phosphate, fluocinolone, prednisolone, prednisolone 21-phosphate, and prednisolone acetate; decongestants such as phenylephrine, naphazoline, and tetrahydrazoline; Miotics and anticholinesterases such as pilocarpine, eserine salicylate, carbachol, di-isopropyl fluorophosphate, phospholine iodide, and demecarium bromide; Mydriatics such as atropine sulfate, cyclopentolate, homatropine, scopolamine, tropicamide, eucatropine, and hydroxyamphetamine; and Sympathomimetics such as epinephrine. Drugs can be in various forms, such as uncharged molecules, components of molecular complexes, or nonirritating, pharmacologically acceptable salts, such as hydrochloride, hydrobromide, sulfate, phosphate, nitrate, borate, acetate, maleate, tartrate, salicylate, etc. Furthermore, simple derivatives of the drugs (such as ethers, esters, amides, etc.) which have desirable retention and release characteristics but which are easily hydrolyzed by body pH, enzymes, etc. can be employed. The amount of drug incorporated in the ocular insert varies widely, depending on the particular drug, the desired therapeutic effect, and the time span for which the ocular insert will be used. Since the ocular insert is intended to provide the complete dosage regime for eye therapy for but a particular time span, such as 24 hours, there is no critical upper limit on the amount of drug incorporated in the device. For when the device is removed and disposed of it makes little difference whether any drug remains in the device. The lower limit will depend on the activity of the drug and its capability of being released from the device. Thus it is not practical to define a range for the therapeutically effective amount of drug incorporated into the device. However, typically, from 1 microgram to 1 milligram of drug is incorporated in the ocular insert.

To use the ocular insert, it is inserted in the cul-de-sac of the conjunctiva between the sclera of the eyeball and the lid. While the ocular insert can be inserted under either the upper lid or the lower lid, placement of the ocular insert under the lower lid is preferred. The eye has a tendency to roll upwardly during sleeping, known as Bell's Phenomenon, which may cause discomfort to some persons if the ocular insert is under the upper lid. Once in place, the ocular insert functions as a drug reservoir gradually releasing drug to the eye and surrounding tissues. Drug leaving the ocular insert, whether by diffusion through the walls of the insert or as a result of the leaching action of tear liquid, is transported to the eyeball by the flow of tear liquid or by the blinking action of the eyelids.

By use of the ocular insert, the eye is continuously bathed with drug over a particular time span. Normally, the ocular insert will be retained in place for a period of 24 hours, thereby supplying the complete dosage regime for eye therapy over that period of time.

The ocular insert can be fabricated in any convenient shape for comfortable retention in the cul-de-sac. Thus, the marginal outline of the ocular insert can be ellipsoid, beanshape, rectangular, etc. In cross section, it can be concavoconvex, rectangular, etc. As the ocular insert is flexible and, in use, will assume essentially the configuration of the cul-de-sac, the original shape of the device is not of controlling importance. Dimensions of the device can vary widely. The lower limit on the size of the device is governed by the amount of the particular drug to be supplied to the eye and surrounding tissues to elicit the desired pharmacologic response, as well as by the smallest sized device which conveniently can be inserted and removed from the eye. The upper limit on the size of the device is governed by the limited space within the cul-de-sac that conveniently and comfortably can be filled with an ocular insert. Typically, the ocular insert is 4 to 20 millimeters in length, 1 to 12 millimeters in width, and 0.1 to 1 millimeter in thickness.

Thus, these ocular inserts are quite small. In a program of usage of an insert comprising a 24 hour dosage regime, an ocular insert must be inserted and removed each day. Because of the small size, problems have been encountered in inserting and removing these inserts.

SUMMARY OF THE INVENTION

Accordingly, it is one object of this invention to provide an improved drug dispensing ocular insert which can be conveniently inserted and removed from the cul-de-sac of the conjunctiva between the sclera of the eyeball and the lid.

Another object of this invention is to provide a drug dispensing ocular insert which can be quickly and easily inserted and removed by use of a magnetic tool.

In accomplishing these objects, one feature of this invention resides in a drug dispensing ocular insert comprising a flexible body containing a drug and adapted for insertion into the cul-de-sac of the conjunctiva between the sclera of the eyeball and the lid to dispense drug to the eye over a prolonged period of time, the ocular insert having incorporated therein a magnetically attractable substance to thereby permit insertion and removal of the insert by magnetic means.

DETAILED DESCRIPTION OF THE INVENTION

Figure 1:
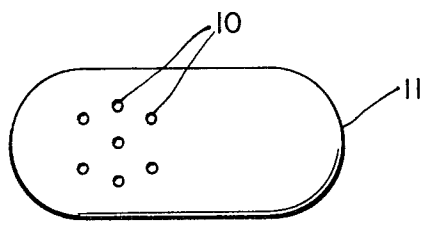
FIG. 1 is a plan view of the ocular insert with the magnetically attractable particles dispersed throughout.

In accordance with this invention, as illustrated in FIG. 1, a magnetically attractable material 10, such as iron or an iron alloy, is incorporated into the ocular 11 insert of the type previously described in an amount sufficient to render the insert magnetically attractable. The magnetically attractable material can be dispersed throughout the ocular insert or can be isolated therein, as at the core.

Magnetically attractable material can be incorporated in the ocular insert in any convenient manner. When the ocular insert is in the form of a polymeric matrix with the drug uniformly distributed therethrough, the magnetically attractable material can be added to the polymer, in liquid form, prior to molding or casting to the final shape. When the ocular insert takes the form of a hollow capsule with drug in the central compartment thereof, the magnetically attractable material can be dispersed throughout the polymeric walls of the insert or can be disposed within the central compartment. For ease of manipulation, the magnetically attractable substance can be localized at the corners of the ocular insert.

In a presently preferred embodiment of the invention, the magnetically attractable material is encapsulated with a coating that is insoluble in tear liquid and nonirritating to the eye and surrounding tissues. Use of encapsulated magnetically attractable material prevents any possible irritation to the eye from the foreign matter. Suitable encapsulating materials include silicone rubber, cellulose derivatives such as cellulose ethers and cellulose esters, nylon, polyvinylchloride, polyvinylalcohol, polyvinylacetate, polyvinylpyrrolidone, modified collagen, and other nonirritating polymeric materials. Of course, when the ocular insert is fashioned so that the magnetically attractable material is not disposed on the surface thereof and will not come in direct contact with the eye or surrounding tissues, encapsulation is unnecessary.

Figure 2:
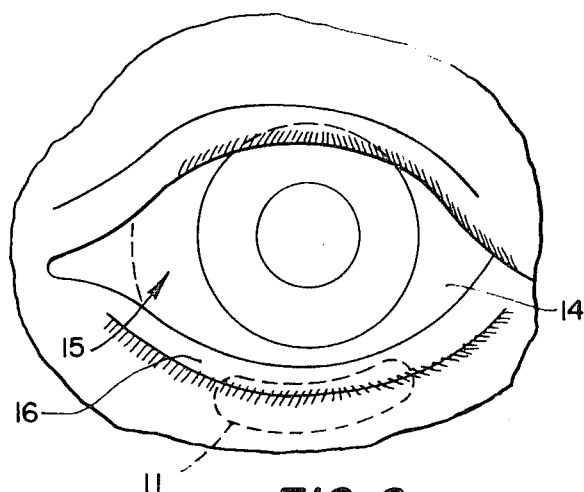
FIG. 2 is an illustration of a human eye showing the ocular insert located in place under the lower eye lid.
Figure 3:
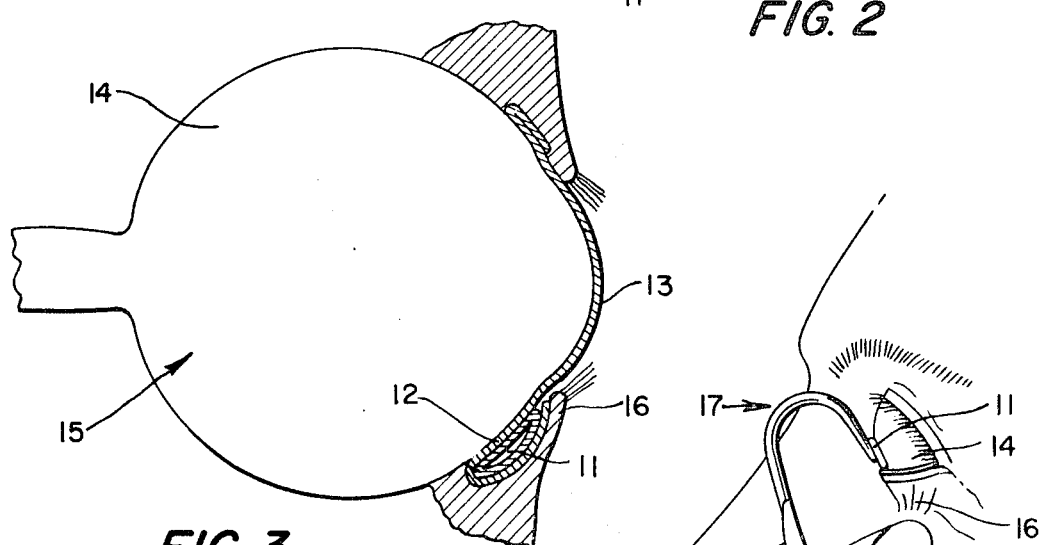
FIG. 3 is a cross section of the human eye as shown in FIG. 2.
Figure 4:
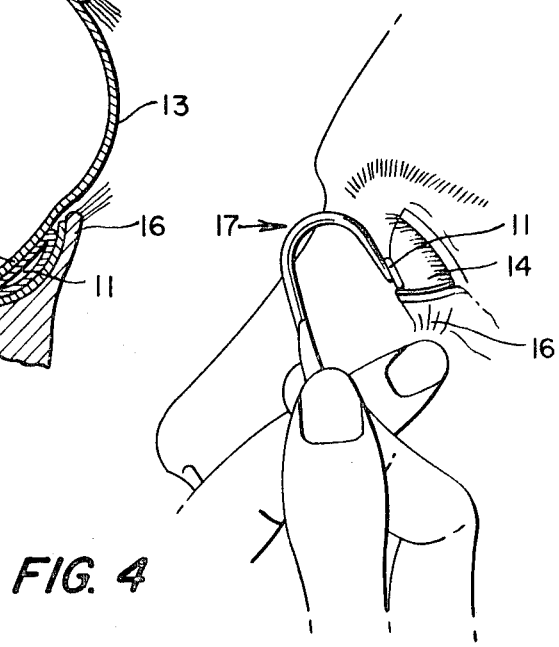
FIG. 4 is an illustration of the method of manipulating the ocular insert of FIG. 1 against the eye.

The improved drug dispensing ocular insert 11 of this invention can be conveniently and quickly disposed within the cul-de-sac 12 of the conjunctiva 13 between the sclera 14 of the eyeball 15 and either the upper or lower lid 16 using a magnetic tool 17. See FIGS. 2, 3 and 4. The particular form of the magnetic tool forms no part of the present invention and tools of various configuration and designs can be employed. Usually, an elongated rod with a magnetic tip, preferably coated with a material that is nonirritating to the eye and surrounding tissue, is used to insert the ocular insert. To avoid any contamination of the eye, the coating on the magnetic tool can take the form of a sterile disposable cover, which is changed before each use. The upper or lower eyelid is pulled outwardly to open the cul-de-sac and the device is inserted therein and manipulated to the proper place with the magnetic tool (see FIG. 4). Thereafter, the eyelid is released to close the cul-de-sac and the tool is disengaged from the ocular insert by a gentle pulling motion. The insert is removed from the cul-de-sac in a similar manner. When the tool used to insert and remove the ocular insert is an electromagnet, the operation is eased since the insert can be disengaged from the tool by terminating current flow to the tip of the tool.

Usually, drug dispensing ocular inserts are designed to dispense drugs to the eye over a period of 24 hours. When repeated daily therapy is required, devices must be inserted and removed once a day. By using the improved ocular insert of this invention, the previously awkward procedures in which the insert was sometimes contaminated by contact with the patient's fingers is eliminated and a sanitary means provided for inserting and removing the insert under aseptic conditions.

While there have been described and pointed out the fundamental novel features of the invention as applied to the preferred embodiment, those skilled in the art will appreciate that various changes and modifications and omissions from the drug dispensing ocular insert described herein can be made without departing from the spirit of the invention. It is the intention, therefore, to be limited only by the scope of the claims which follow.

What is claimed is:

1. In a drug dispensing ocular insert comprising a flexible body containing a drug and adapted for insertion into the cul-de-sac of the conjunctiva between the sclera of the eyeball and the lid to dispense drug to the eye over a prolonged period of time, the improvement for allowing insertion and removal of said ocular insert by magnetic means comprising incorporating into said ocular insert an amount of a nonmagnetic but magnetically attractable substance sufficient to render said ocular insert magnetically attractable.

2. The ocular insert of claim 1 wherein said nonmagnetic but magnetically attractable substance is encapsulated with a protective coating that is nonirritating to the eye.

3. The ocular insert of claim 1 wherein said nonmagnetic but magnetically attractable substance is dispersed throughout same.

4. The ocular insert of claim 1 wherein said nonmagnetic but magnetically attractable substance is isolated therein.

* * * * *